Patented Aug. 2, 1932

1,869,496

UNITED STATES PATENT OFFICE

HANS OSBORG, OF FRANKFORT-ON-THE-MAIN, GERMANY

ART OF TREATING METALS

No Drawing.   Application filed September 6, 1930.   Serial No. 480,179.

The present invention relates to the art of treating metals to improve the qualities thereof and more particularly to the art of treating metals with a hydrogen-bearing substance and to a hydrogen-bearing substance useful in the aforesaid treatment.

It is an object of the present invention to provide an improved process for treating metals to de-oxidize and to degasify the same and to improve the qualities thereof by the use of a hydrogen-bearing substance.

It is a further object of the invention to provide a hydrogen-bearing substance which can be manufactured satisfactorily and practically on an industrial scale and on an economical basis.

Another object of the invention is to provide a hydrogen bearing substance which can be handled like a salt in relatively stable state in dry air, and which has a relatively high melting point.

A further object of the invention is to provide a hydrogen-bearing substance which contains a constituent which improves the crystal structure, hardness, elasticity, fluidity, electrical conductivity and/or other physical and mechanical properties of the metal.

It is also within the contemplation of the invention to provide a substance for the treatment of metals for the improvement thereof which contains hydrogen and lithium or an alloy of lithium.

I have discovered that when a hydrogen-bearing substance such as lithium-hydride is added to molten metals and alloys, especially those which have no affinity for hydrogen, the molten metallic mass is deoxidized and degasified better by them when conventional degasifying and deoxidizing agents are used and that the physical and mechanical properties of the molten metallic mass are also improved. I have found that a hydrogen-bearing substance such as lithium-hydride can be added to molten metals and alloys conveniently because the melting point of lithium-hydride, for example, is about 680° C. Substances of the lithium-hydride type perform a dual function in the improvement of molten metals and alloys treated therewith.

The hydrogen in the substance takes up gases including oxygen and impurities such as sulphur, phosphorus and the like and generally cleanses the metal while the lithium and/or equivalent metal improves the crystal structure of the metal or alloy treated, the hardness, elasticity, strength, electrical conductivity and/or fluidity thereof. The lithium and/or equivalent metal also removes practically all of the remaining oxygen and impurities. Metals and alloys when treated in accordance with the foregoing have improved qualities and properties over metals and alloys when treated with conventional scavenging agents.

For a better understanding of the invention, the following description of a specific example is given for purposes of illustrating the use of a hydrogen-bearing substance in the treatment of a metal having no affinity for hydrogen, such as silver and silver alloys. It must be observed, however, that other alloys which have no or only a little affinity for hydrogen such as cadmium, lead, bismuth, antimony, gold, zinc, tin, thallium, rhodium and others and alloys thereof can be treated in the same way. When metals or alloys are treated which have little or no affinity for hydrogen, practically any amount of hydrogen-bearing material can be added because the molten metal will not combine with hydrogen when hot and will release it just before the metals or alloys freeze.

The silver or silver alloys to be treated are subjected to the customary processes of treatment in the production of pig silver or the like. Preferably just prior to the casting of the silver or silver alloy into pigs or other objects, I add a solid hydrogen-bearing substance such as lithium-hydride to the molten mass of silver or silver alloy and thoroughly mix said hydrogen-bearing substance in the mass. The mixing is continued until a thorough distribution of the hydrogen-bearing substance has been effected. When sufficient time has elapsed for the lithium-hydride to have acted upon the silver or silver alloy, the molten mass is ready to be cast in the form of pigs or other objects. During this treatment, hydrogen is liberated from the lithium hydride and combined with the oxygen and other gases and also combines with impurities such as sulphur, phosphorus and the like whereas the lithium which is liberated improves the metal or alloy and particularly the physical and mechanical properties of the silver or silver alloy when solidified. These improvements may include a better crystal structure and/or a harder, a more elastic, denser and stronger silver metal or alloy. In addition, the fluidity of the molten mass is improved and instead of the molten mass flowing like molasses, it flows like a thin liquid which makes much better casting. The electrical conductivity is likewise improved.

In practice, the amount of lithium-hydride or other hydrogen bearing substance used for the treatment of metals or alloys, depends upon the amount of impurities in the treated metals and alloys, the amount of oxides and oxygen included therein and the percentage of gas to be removed. As one skilled in the art will readily understand, this percentage varies within wide limits depending upon the type of metal and the source of production of said metals and alloys. With silver and silver alloys, up to about 0.1 parts of lithium-hydride is capable of treating about 100 parts of silver.

Copper or copper alloys can also be treated in accordance with my procedure. In other words, metals and alloys, such as copper or copper alloys, which have an affinity for hydrogen can be treated according to the principles of the present invention. When thus treated, the copper or copper alloy is subjected to the customary processes of treatment in the production of pig copper or the like. It is preferred to add just prior to the casting of the molten copper or copper alloy into pigs or other objects of high electrical conductivity, a solid hydrogen-bearing substance such as a hydride lithium-calcium alloy to the molten mass of copper or copper alloy and thoroughly mix said hydrogen-bearing substance in the mass. The mixing is continued until a thorough distribution of the hydrogen-bearing substance has been effected. When sufficient time has elapsed for the lithium-calcium to have acted upon the copper or copper alloy, the molten mass is ready to be cast in the form of pigs or other objects. During this treatment, hydrogen is liberated from the lithium hydride and combined with the oxygen and other gases and also combines with impurities such as sulphur, phosphorus and the like whereas the lithium and calcium which are liberated improve the metal or alloy and the lithium particularly improves the physical and mechanical properties of the solidified copper or copper alloy. These improvements may include a better crystal structure and/or a harder, a more elastic, denser and stronger copper metal or alloy, and in addition, the fluidity of the molten mass is improved and instead of the molten mass flowing like molasses, it flows like a thin liquid which makes much better casting. In any case, however, the electrical conductivity of copper is improved by the aforesaid treatment. In addition lithium removes practically all of the remaining oxygen and impurities. In short, the treated copper or the like appears to be practically completely deoxidized, substantially free from blow holes, black spots and other defects and constituted of the desired sunburst crystal structure.

In practice, the amount of lithium-calcium hydride or other hydrogen bearing substance used for the treatment of metals or alloys, depends upon the amount of impurities in the treated metals and alloys, the amount of oxides and oxygen included therein and the percentage of gas to be removed. As one skilled in the art will readily understand, this percentage varies within wide limits depending upon the type of metals and the source of production of said metals and alloys. With copper and copper alloys, from about 0.02% up to about 0.4% of lithium-calcium hydride produced from a 50-50 lithium and calcium alloy is capable of treating about 100 parts of copper. It is to be observed that the amount of hydrogen-bearing substance or lithium hydride should be limited in amount so that no free hydrogen is dissolved in the molten mass and then liberated when cooled. In other words, metals and alloys having an affinity for hydrogen combine with the same when hot, if free hydrogen is present after oxygen and impurities are removed, and then release the thus combined hydrogen when cold to cause the formation of blow holes, imperfections, etc. In short, less hydrogen must be added to metals or alloys which have an affinity for hydrogen than an amount theoretically required to combine with the impurities therein in order to prevent the occurrence of free hydrogen in the metals or alloys. The impurities not removed by hydrogen are removed by lithium or an equivalent substance thereof.

The use of lithium-calcium hydride makes it possible to operate under a charcoal cover because lithium and calcium tend to go into the slag. Moreover, calcium staying with the metallic copper has no detrimental effects if traces of calcium remain dissolved in the copper.

When lithium-calcium hydride is used as the hydrogen-bearing substance, then the hydride can be accompanied by an excess of lithium or calcium or can be accompanied with lithium-silicide. For instance, in making the lithium-calcium hydride an excess of lithium or calcium or both is used so that the finished product contained free lithium or both. In case it is desired to have the lithium-calcium hydride contain or be mixed with lithium silicide, the following procedure can be employed:

A convenient way for making an intimate mixture of lithium-calcium hydride and a lithium silicide composition is to first produce a composition containing lithium-calcium and silicon with an excess of lithium or calcium or both, such as set forth in my companion application bearing a Serial No. 466,584 and a filing date of July 8, 1930, and thereafter hydrogenating the said lithium-calcium silicon composition containing an excess of lithium or calcium or both until practically all of the free lithium and/or calcium has combined with hydrogen to form lithium and/or calcium hydride. Another way to make the aforesaid mixture is to make the said lithium-silicon composition containing an excess of lithium or calcium or both in the presence of a hydrogen atmosphere so that the product can be made in one operation. Of course, mixtures may also be made by mixing lithium-calcium hydride with a composition of lithium or lithium-calcium silicon.

In the treatment of copper containing arsenic and selenium according to the present method, it has been found that substantially all of the arsenic and selenium are removed in the slag, or in the vapors evolved from the melt. By the present method therefore, it is possible to produce copper or alloys thereof substantially free from arsenic and selenium.

When lithium-hydride is used as the hydrogen-bearing substance, then the lithium-hydride can be accompanied by an excess of lithium or can be accompanied with lithium-silicide. For instance, in making the lithium-hydride an excess of lithium is used so that the finished product contained free lithium. In case it is desired to have the lithium-hydride contained or be mixed with lithium silicide, the following procedure can be employed:

A convenient way for making an intimate mixture of lithium-hydride and a lithium silicide composition is to first produce a composition containing lithium and silicon with an excess of lithium, such as set forth in my companion application bearing a Serial No. 466,584 and a filing date of July 8, 1930 and thereafter hydrogenating the said lithium silicon composition containing an excess of lithium until practically all of the free lithium has combined with hydrogen to form lithium hydride. Another way to make the aforesaid mixture is to make the lithium-silicon composition containing an excess of lithium in the presence of a hydrogen atmosphere so that the product can be made in one operation. Of course, mixtures may also be made by mixing lithium hydride with a composition of lithium silicon.

The refining of zinc especially electrolytic zinc can be improved by the use of my method and of a hydrogen-bearing substance. At the present time the losses of zinc run to about 2 to 5% in the conventional methods of zinc refining. By the use of my method and refining agent, these losses can be reduced to a minimum. In carrying my process in practice, the pig or metallic zinc is melted under a fused salt cover or in any other appropriate way and then a hydrogen-bearing substance, such as lithium hydride, is incorporated in the molten metallic mass. The liberated hydrogen reacts with oxygen, sulphate and the like and removes the same from the melt. Lithium up to 0.1%, especially in amount of 0.025% improves the metallic zinc. However, higher amounts of lithium, say up to 1%, will improve the thus purified zinc.

In the treatment of cast iron, satisfactory results have been obtained by introducing about 0.02% up to about 0.4% of lithium-barium or barium hydride by weight in the melt in a bull ladle. The cast iron thus treated was of a much better grade than ordinary cast iron and possessed better and improved properties.

Nickel and nickel alloys, such as monel, may be treated in accordance with the present invention. For instance, lithium-strontium or barium hydride can be introduced into a molten mass of monel to the extent of about 0.02% up to about 0.4% by weight. The monel thus treated has a better structure, is clean and free from segregations and has improved properties.

A carbon steel was treated by adding about 0.02% up to about 0.4% to about 0.2% of cerium hydride or lithium-cerium hydride by weight. The treated steel pours better and forms better ingots than untreated steel and has improved properties.

An alloy steel, such as nickel-chromium steel, may be improved by treating it in the molten state with lanthanum hydride and lithium-lanthanum hydride. The hydride can be added to an extent of about 0.02% to about 0.4% by weight. In general, the present treatment produces an increase in temperature of the molten metal, a better fluidity of the molten bath, better castings, improved crystal structure, cleaner metal and superior metal with respect to physical and mechanical properties and an improved corrosion resistance.

In the foregoing examples, lithium hydrogen has been specified as a typical hydrogen-bearing substance but it is to be understood that other hydrogen-bearing substances can also be used. For instance, alloys of lithium such as calcium, sodium or the like or mixtures thereof, can be hydrided and used as described hereinabove. Then again hydrides of sodium or of calcium or of other members of the alkali group or alkali earth group can be employed. Besides the alkali earths, members of the rare earth group can be used. This latter procedure is especially beneficial when it is desired to introduce a member of the rare earth group into the metallic mass. When the expression alkali earth group is used in the claims therefore, it is intended to include the rare earth group.

The salt like hydrides of the metals of alkali, alkaline earth and rare earth groups refer to those compounds mentioned by Dr. Fritz Ephraim on pages 754 and 757 of his text book on Inorganic Chemistry which has been translated by P. C. L. Thorne and published by Gurney and Jackson of London in 1926. These hydrides are also described on pages 47 and 48 in the Atlas der physikalischen und anorganischen Chemie which is written by von Prof. Dr. A. von Antropoff und Dr. M. von Stackelberg. In addition, the aforesaid Atlas includes the Figure 17 which depicts the hydrides in question. In other words, it has been found that the hydrides of lithium, sodium, potassium, barium, strontium, calcium, cerium and lanthanum are especially effective for the treatment of metals and alloys as described in the present specification.

In practice in many cases, it is desirable to dilute the lithium hydride or the like with a diluent. It is preferred to use the metal under treatment as the diluent. For instance, if copper is to be treated, then a lithium-copper hydride or a lithium-calcium-copper hydride may be employed. In this manner, a more uniform and quiet action may be obtained and a prevention of violent reactions may be effected.

It will be observed that my invention provides a convenient process of treating metals and alloys with hydrogen-bearing substances such as lithium-hydride so that the hydrogen combines with oxygen and impurities such as sulphur and phosphorus and takes up gases and thus permits the lithium to assert its beneficial action upon the metals and alloys without being inefficiently consumed with oxygen, sulphur, phosphorus and the like. In this manner, a less costly method and substance is made available to the art for the treatment of metals and alloys to improve the qualities and properties thereof. In addition, the presence and function of hydrogen saves the consumption of expensive lithium.

It will be noted that the metals having an affinity for hydrogen include all metals except cadmium, thallium, zinc, lead, bismuth, tin, antimony, gold, silver, rhodium and tungsten. These metals are pointed out on page 754 in a text book of Inorganic Chemistry by Dr. Fritz Ephraim which has been translated by P. C. L. Thorne and published by Gurney and Jackson of London in 1926.

It will also be noted that when lithium hydride is used for treating metals and alloys, the consumption is about 30 to 50% less than when lithium is used by itself.

It will be observed that the present invention provides a process which can be utilized on an industrial scale to produce sucessful and satisfactory results which are acceptable to those skilled in the art and the trade.

It will be further observed that the present invention provides a process for the production of articles of manufacture comprising improved metals and alloys which not only can be carried out on a laboratory scale but which also can be carried out on an industrial scale.

It will also be noted that the present invention utilizes hydrides of a metal of the alkali group or the alkaline earth group or the rare earth group and which hydrides have a salt-like character. In the molten state the hydrogen of the hydride acts as anion just like the chloride in molten sodium chloride. For convenience, the metal of the alkali group, or alkaline earth group, or rare earth group has been designated in the claims as an "alkali" metal. It is to be understood that the expression "hydrogen-bearing substance" used herein refers to the aforesaid hydrides.

What is claimed is:

1. The process of treating metals or alloys in a molten state which comprises incorporating in the molten metallic mass to be treated a salt-like hydride of an "alkali" metal capable of taking up gases and impurities in said mass and of improving the qualities of the metal under treatment.

2. The process of treating metals or alloys in a molten state which comprises adding a solid substance containing lithium hydride to a molten metallic mass to be treated and mixing said solid within said molten mass.

3. The process set forth in claim 2 in which the solid substance contains calcium hydride.

4. The process of treating metals or alloys in a molten state which comprises adding a solid substance containing lithium hydride and mixing it to a molten metallic mass, continuing said mixing until a substantially thorough distribution of said lithium hydride in said molten mass has been effected and permitting said substance containing lithium hydride to remain in contact with said molten mass for a period sufficient to effect a removal of the bulk of detrimental gases and impurities and to improve the qualities of the metallic mass under treatment.

5. The process of treating metals or alloys in a molten state which comprises mixing a solid substance containing lithium hydride and a composition containing lithium and silicon to a molten metallic mass, continuing said mixing until a substantially thorough distribution of said lithium hydride in said molten mass has been effected and permitting said solid to remain in contact with said molten mass for a period sufficient to effect a removal of the bulk of detrimental gases and impurities and to improve the qualities of the metallic mass under treatment.

6. The process of treating silver or silver alloys in a molten state which comprises incorporating in silver and/or silver alloys while in a molten state a salt-like hydride of an "alkali" metal.

7. The process of treating copper or copper alloys in a molten state which comprises incorporating in copper and/or copper alloys while in a molten state a salt-like hydride of an "alkali" metal.

8. The process of treating zinc or zinc alloys in a molten state which comprises incorporating in zinc and/or zinc alloys while in a molten state a salt-like hydride of an "alkali" metal.

9. An article of manufacture comprising improved metal or alloys resulting from the process set forth in claim 1.

10. An article of manufacture comprising improved silver or silver alloys resulting from the process set forth in claim 6.

11. An article of manufacture comprising improved copper or copper alloys resulting from the process set forth in claim 7.

12. An article of manufacture comprising improved zinc or zinc alloys resulting from the process set forth in claim 8.

13. The process set forth in claim 1 in which the molten metal or alloy under treatment has an affinity for hydrogen and the amount of salt like hydride is limited to an amount just about sufficient to take care of the gases, impurities, etc. in the metal or alloy.

In testimony whereof I have hereunto set my hand.

HANS OSBORG.